United States Patent [19]
Becktold

[11] Patent Number: 5,695,649
[45] Date of Patent: *Dec. 9, 1997

[54] METHOD AND APPARATUS FOR REMOVING SLUDGE FROM AN ENCLOSURE

[75] Inventor: Bryon Edward Becktold, Mattawan, Mich.

[73] Assignee: Becktold Enterprises Inc., Kalamazoo, Mich.

[*] Notice: The portion of the term of this patent subsequent to Jul. 25, 2015, has been disclaimed.

[21] Appl. No.: 677,602

[22] Filed: Jul. 8, 1996

Related U.S. Application Data

[62] Division of Ser. No. 506,171, Jul. 25, 1995, Pat. No. 5,578,220.

[51] Int. Cl.⁶ .................................................. B01D 37/00
[52] U.S. Cl. .......................... 210/747; 210/805; 15/1.7; 134/10; 134/22.18
[58] Field of Search ..................... 15/1.7; 210/172, 210/241, 459, 460, 747, 767, 805; 134/10, 22.18

[56] References Cited

U.S. PATENT DOCUMENTS

| | | |
|---|---|---|
| Re. 10,475 | 5/1884 | McFeely. |
| Re. 14,246 | 1/1917 | Jakway. |
| 307,855 | 11/1884 | Haughan. |
| 1,643,025 | 9/1927 | Meggenhofen. |
| 1,842,043 | 1/1932 | Modra et al.. |
| 2,010,540 | 8/1935 | Evans ........................ 210/523 |
| 2,044,088 | 6/1936 | Lord ........................ 103/262 |
| 2,798,442 | 7/1957 | Phillips et al. ............. 103/263 |
| 2,856,205 | 10/1958 | Coleman et al. ........... 284/16 |
| 4,943,211 | 7/1990 | Boegh ........................ 417/131 |

FOREIGN PATENT DOCUMENTS

| | | | |
|---|---|---|---|
| 954639 | 8/1982 | U.S.S.R. | F04F 5/00 |
| 1488-588 | 6/1989 | U.S.S.R. | F04F 5/10 |
| 648004 | 12/1950 | United Kingdom. | |

*Primary Examiner*—Robert Popovics
*Attorney, Agent, or Firm*—Joseph K. Andonian

[57] ABSTRACT

A hollow truncated cone shaped device for loosening and vacuuming solid waste and liquid out of a depressed enclosure such as a pit.

6 Claims, 5 Drawing Sheets

METHOD AND APPARATUS FOR REMOVING SLUDGE FROM AN ENCLOSURE

CROSS REFERENCE TO PREVIOUS APPLICATION

This application is a division of my application Ser. No. 08/506,171 filed Jul. 25, 1995, now U.S. Pat. No. 5,578,220, issued Nov. 26, 1996.

TECHNICAL FIELD

This invention relates to a product and process suitable for separating particulate materials from liquids collected in an enclosed area such as a trap or pit and usually intended for disposal. Such particulate materials are often found in waste water resulting from washing operations such as carried out by car wash establishments. Separation makes waste disposal more feasible and economical especially for meeting environmental regulations.

BACKGROUND PRIOR ART

One of the biggest problems facing the car wash industry is the disposal or recycling of grit trap waste or pit sludge. Car wash waste water is often collected in a pit. The water carries with it considerable solid waste or sediment that is washed off the cars. The dispersion of solids, many of which are toxic, cannot be deposited with the water directly into sewers. The bulk of the solid waste settles in the bottom of the pit. The solid waste in the bottom of the pit is still too wet for disposal. Car wash operators are then faced with the task of dewatering the solids, i.e., separating the solids from the water, and disposing of the solids. The crudest method is to shovel the solids from the bottom of the pit, deposit the solids on the ground in the open air and allow the water to evaporate. This requires considerable manual labor and time.

Various vacuum devices have been devised that can loosen the particulate materials from the bottom of a depressed enclosure or pit with a stream of water under pressure and vacuum the mixture up out of the pit. U.S. Pat. No. 4,943,211 discloses a device to remove filter sand from swimming pool filtering systems. However, sludge extracted in that manner from car wash pits would be accompanied with a considerable amount of water. Landfills will not accept such wet sludge since toxins present in the solid waste will leach out into the soil. Toxins of greatest concern are lead, benzene and other petroleum carbons.

The present invention provides a simple and inexpensive way to separate the solids in dry enough condition so that they will meet landfill, local and Environmental Protection Agency requirements for disposal. Although the present invention is especially useful for the car wash industry, it is also useful for any situation where liquids containing solid particulates are present in an enclosure and separation is desirable. Certainly other vehicle washing facilities are faced with the same problem as car wash establishments, i.e., contamination with hazardous substances or petroleum products. Storm sewer traps, flooded basements, swimming pools, wash racks in tool rental agencies, sediment filled boat slips, traps for wash water used in washing materials in manufacturing operations, gold filled river beds and septic tanks can also benefit by employing the product and process of the present invention to separate particulate materials especially solids from liquids. "Pit" or "trap" as used herein refers to any natural or man-made enclosure containing particulate materials which can be retrieved by admixture with liquids and thence separated therefrom.

OBJECTS OF THE INVENTION

It is therefor an object of this invention to provide a simple and inexpensive process and product for extracting particulate materials from a depressed enclosure such as a pit or trap and thence separating the particulate materials from the liquids emanating from the extraction process.

It is also an object of this invention to provide a process and product to facilitate the disposal and recycling of grit trap waste or pit sludge collected in washing operations such as car wash facilities.

Other objects will be apparent from the description which follows.

GENERAL DESCRIPTION OF THE INVENTION

The process of the present invention employs (1) means (such as a sludge vacuum) for directing a stream of carrier liquid (such as water) under pressure to loosen particulate materials collected in a depressed enclosure (such as a pit or trap) and simultaneously vacuuming the loosened particulate materials dispersed in the carrier liquid out of the enclosure, (2) means (such as one to three tub shaped tanks containing filters) for filtering the particulate materials out of the carrier liquid and (3) means for collecting the particulate materials deposited on the filters and directing the carrier liquid to recycling or disposal facilities. A truncated cone shaped vacuum device is preferred for extracting the particulate materials such as sludge from a pit or similar enclosure. Water is the preferred carrier liquid. The preferred tanks possess open tops, filter screens positioned inside the tanks and porous bottoms under the screens. When more than one tank is employed, their sides are slanted in from their larger tops toward their smaller bottoms so the tanks can be telescoped into one another. When three tanks are employed, the first two tanks are approximately the same size. The third tank would preferably be larger than the first two. Sludge like other particulate materials can be shoveled but is preferably vacuumed out of the pit and deposited under pressure onto a stiffened screen located in a fixed position up over one end and slanted down toward the bottom of tank one at an angle. The stiffened screen would itself act as a coarse filter and direct the wet particulates over a slightly less coarse filter screen located along the inside bottom surface of the tank. The particles larger than the openings in the screens would be filtered out and the water would pass out of the tank through the holes in the bottom of the tank. When one tank is used the tank can be set over the pit from which the particulates came and the water returned to the pit through the holes in the bottom of the tank. Relatively coarse particles would be filtered out by tank one. In most cases sludge particles filtered out by tank one would be dry enough or, within a short period of air drying, would be dry enough to pass the "paint filter test" (EPA 9095) and thus can be disposed of in most landfills in accord with local regulations.

The water that passes through tank one can also be passed into tank two into which tank one can be telescoped. The use of more than one tank will reduce the tendency of the screens to plug up. Smaller sized solid particles can be filtered out of the water by using a finer mesh screen in tank two than the screen in tank one. The finer mesh screen preferably consists of a large open-topped disposable filter bag placed over the top edge and down into the bottom of tank two. The water passing out of the bottom of tank one would then pass through the filter bag and out through the holes in the bottom of tank two leaving the smaller sized particles in the bag for disposal. The water passing out of tank two can also be directed back into the pit or trap from whence it came or into tank three.

Even finer sized solid particles can be filtered out of the water after it passes out of tank two by using a finer mesh screen, preferably in the form of a large open-topped disposable filter bag placed over the top and down into the bottom of tank three. The water passing out of the bottom of tank two telescoped into tank three would then pass through the filter bag and out of a small number of openings in the side near the bottom of tank three. To direct the filtered water into a desired location, such as a sewer or the enclosure from which it originated, the holes can be connected to a discharge hose. The water passing out of tank three would ordinarily be free enough of hazardous materials for disposal in a sanitary sewer system.

Solid waste collected in the tanks or filter bags can be disposed of inexpensively, for example in a dumpster, and thence a landfill. When tested the grit trap waste collected in the foregoing manner usually meets the analytical requirements for total amount of contaminant suitable for such disposal unless oil or raw sewage is dumped into the pit. Such waste is no longer considered to be hazardous enough to leach into soil.

The solids can be emptied out of the tanks at the end of each step and the steps can be repeated.

As previously indicated the foregoing process works best when carried out in conjunction with a truncated cone shaped vacuum device sometimes referred to herein as a sludge vacuum. The sludge vacuum possesses an enlarged intake opening, preferably a truncated hollow conical funnel shaped suction head attached to a flexible ridged exhaust hose at the truncated end of cone portion of the funnel. A smaller hose or pipe, such as a pressure water wand commonly found in a car wash, capable of feeding water under pressure into a passage through the side of the hollow cone into the center of the cone. The water is then redirected by a T-shaped connection into a passage that extends both up toward the truncated end of the cone and down out of the large or base end of the funnel. A nozzle is preferably fixed on both ends of the passage extending into both ends of the cone portion of the funnel. The nozzle for the downward spray out of the vacuum is preferably smaller than the nozzle for the upward spray toward the exhaust hose. The stream of water directed out of the large end of the funnel has sufficient pressure to stir up sludge from the bottom of a pit into which the large end of the funnel is directed. The stream of water directed into the truncated end of the funnel cone creates sufficient suction to pull the water and sludge mixture into the exhaust hose to a collection site such as the tanks indicated above. The discharge from a typical sludge vacuum is 10–15 times the output of a pressure washer. The higher the pressure washer volume the more volume the sludge vacuum will pump. The sludge vacuum can pick up debris in sizes up to ¾ inches. A plate containing relatively large holes fixed on the outside of the large end of the funnel will keep the funnel and hose from being plugged up by large debris commonly found in sludge pits.

The present method and apparatus provides fast and economical on site drying or separation of particulate materials dispersed in a liquid medium. The apparatus is light weight, easily stored, easily transported, economical and easy to use. It can be used with or without a sludge vacuum. It comes in three separate stages permitting separation of coarse particles, medium particles and/or fine particles. It permits return of the filtrate or liquid medium back to the place from which it originated. There are no moving parts in the apparatus itself, no use of electricity around water and no maintenance. No heavy equipment is required to move the separated particulate materials.

LIST OF REFERENCE NUMERALS

Figure 1B:
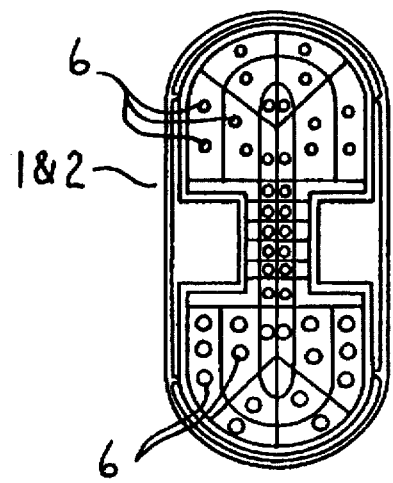
FIG. 1B depicts a bottom view of tank 1 which is identical to the bottom of tank 2.

1 Tank 1
2 Tank 2
3 Tank 3
4 Slant screen in tank 1
5 Coarse screen in tank 1
6 Holes in the bottom of tanks 1 and 2
7 Medium mesh bag in tank 2
8 Fine mesh bag in tank 3
9 Openings in the side near the bottom of tank 3
10 Hollow truncated cone at the intake opening of the sludge vacuum
11 Exhaust hose connected to the small end of the cone
12 Pipe to deliver water under pressure to cone
13 Passage for water entering cone
14 End of passage for water directed into the truncated end of cone
15 End of passage for water directed into the base or large end of cone
16 Truncated or small end of cone
17 Base or large end of cone
18 Sludge pit
19 Sludge
20 Sludge vacuum
21 Nozzle at 14
22 Nozzle at 15
23 Plate fixed to the bottom of sludge vacuum 20
24 Holes in plate 23
25 Hardware cloth screen

PREFERRED EMBODIMENT

Figure 6:
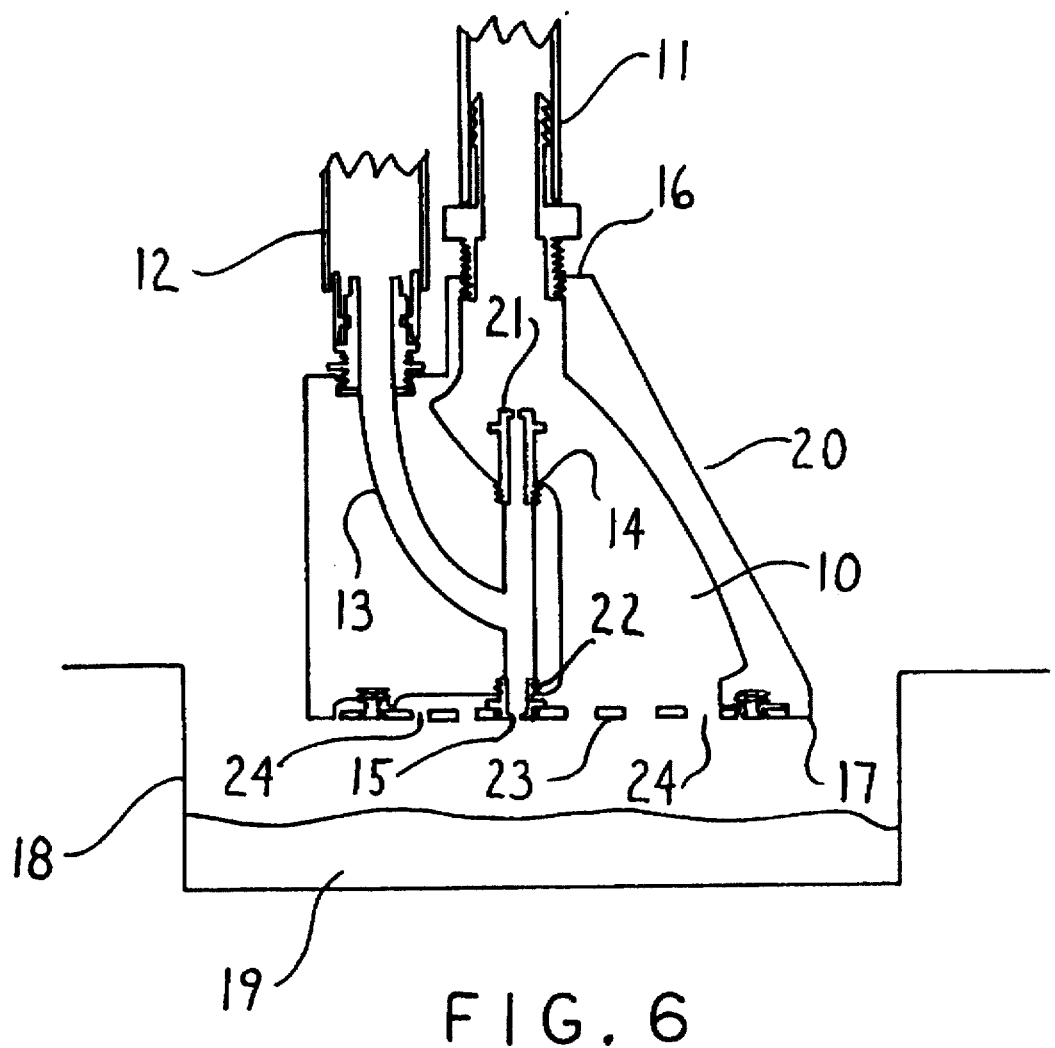
FIG. 6 depicts a cross section of the sludge vacuum along line A—A of FIG. 5.

The preferred embodiment of one product of the present invention is depicted in cross section in FIG. 6 which is assembled in the following manner.

Figure 3A:
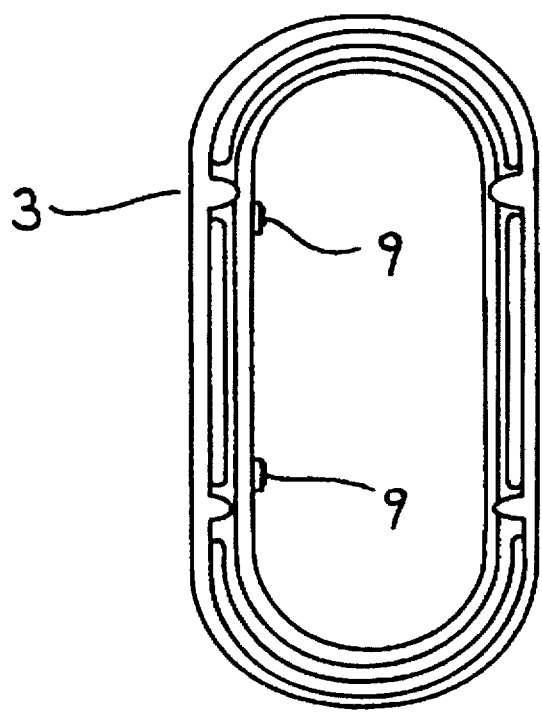
FIG. 3A depicts a top view of tank 3.
Figure 3B:
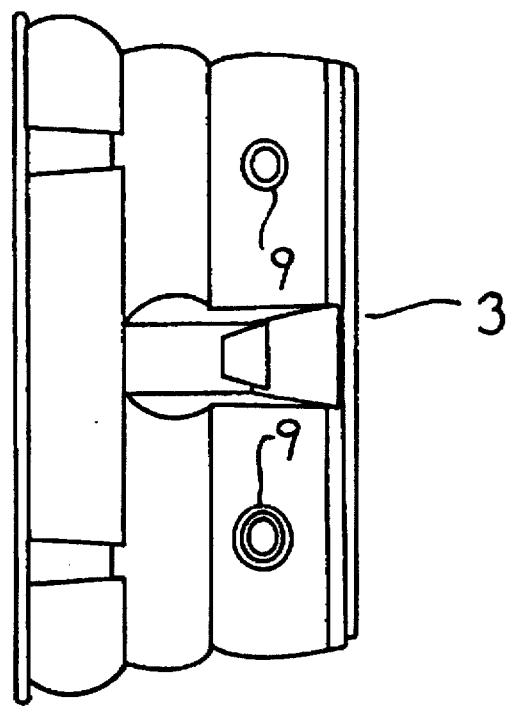
FIG. 3B depicts a side view of tank 3.
Figure 4:
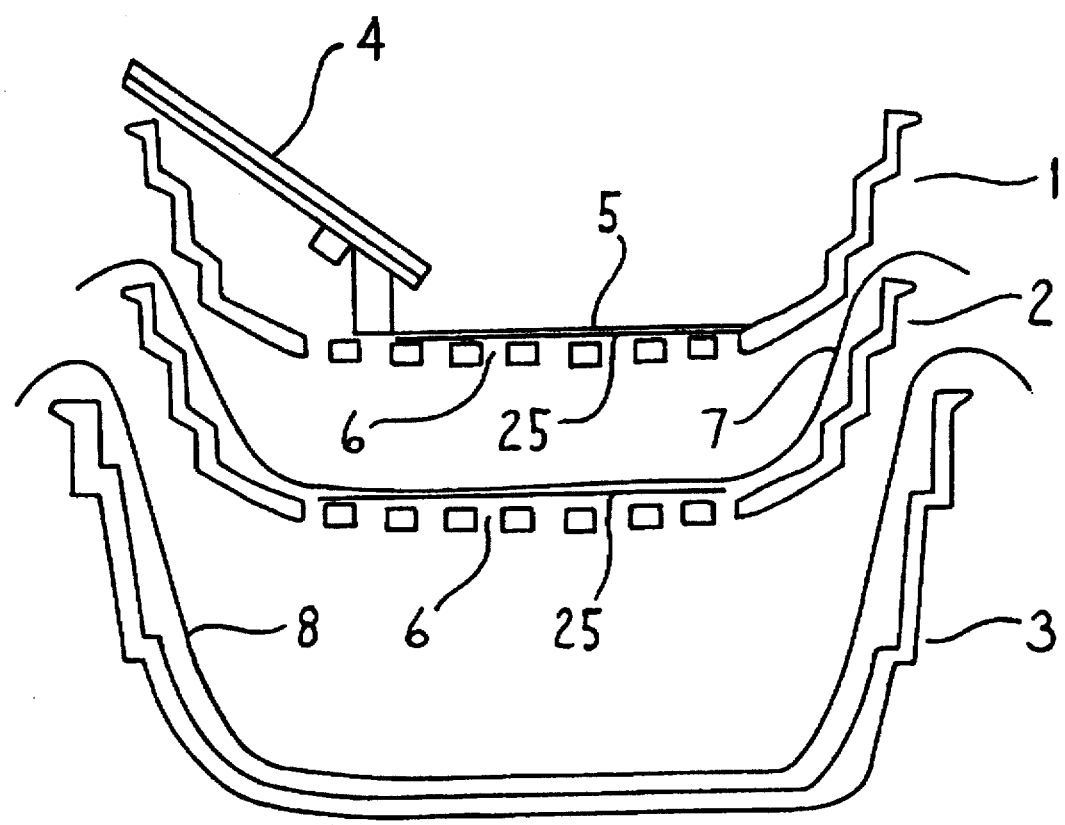
FIG. 4 depicts a cross section of a three tank system along the longitudinal midline of the tanks.

A fine mesh bag 8 consisting of 180 mesh per square inch is fitted into tank 3 with the large open end of the bag 8 overlapping the edges of the open top of tank 3 and the sides of the bag 8 lining the inside surface of tank 3. An appropriate capacity for tank 3 would be 100 gallons consistent with ease of handling a sludge filled tank extracted from the average sized car wash pit. The inside dimensions of the oval top of tank 3 would be about 48 inches in length and about 30 inches in width. The rounded ends of the top of tank 3 would have a radius of about 15 inches. The height of tank 3 would be about 24 inches. The sides of tank 3 would taper inward in three steps from the top to the bottom of the tank. The dimensions of the oval bottom of tank 3 would be about 40 inches in length and about 20 inches in width. The top and bottom views of tank 3 are depicted in FIGS. 3A and 3B. Tank 3 has two one and one half inch diameter openings along one side near the bottom of the tank. A discharge hose, not shown, can be connected to these openings to direct the filtered water to a desired location such as a sewer opening or to return the water to the original grit trap from which it came.

Figure 2A:
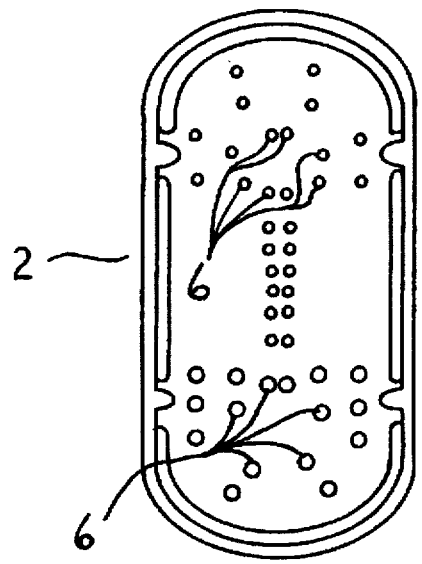
FIG. 2A depicts a top view of tank 2.

A medium mesh bag 7 consisting of 100 mesh per square inch is fitted into tank 2 in the same manner as bag 8 was in tank 3. Hardware cloth 25 is affixed over the holes in the bottom of tank 2 under the bag 8 to provide additional filtration. Hardware cloth consists of galvanized woven wire preferably with openings of about 1/8 inch square. An appropriate capacity for tank 2 to fit inside tank 3 and allow space for sludge to collect underneath tank 2 in tank 3 would be 50 gallons. The dimensions of the top of tank 2 would be about the same as tank 3. The height of tank 2 would be shorter, e.g., about 12 inches. The dimensions of the bottom and the inward taper of the sides would be the same as tank 3 albeit in two steps instead of three. The top view of tank 2 is depicted in FIG. 2A. The bottom view is depicted in FIG. 1B which is the same as the bottom view of tank 1. About 100 holes of about one inch in diameter is dispersed evenly throughout the bottom of tank 2. Tank 2 is telescoped part of the way into tank 3, leaving space for collection of sludge in tank 3.

Figure 1A:
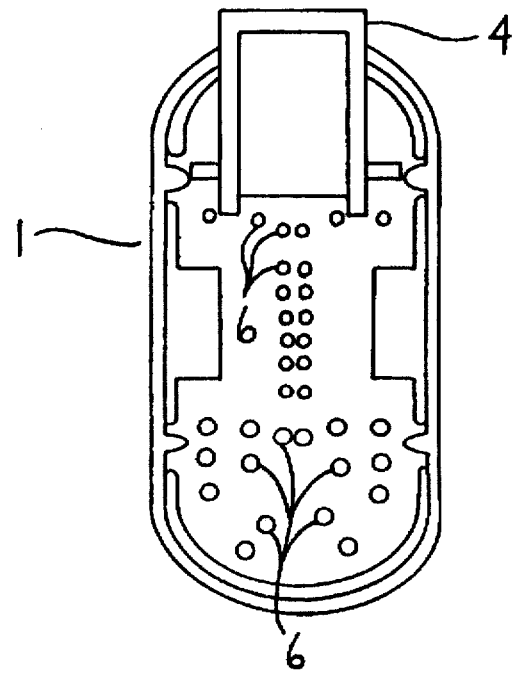
FIG. 1A depicts a top view of tank 1.

Tank 1 is then telescoped into tank 2. An appropriate capacity for tank 1 to fit inside tank 2 and allow space for collection of sludge underneath tank 1 in the bottom of tank 2 would be 50 gallons. The dimensions and overall construction of tank 1 would be the same as tank 2. The top and bottom views of tank 1 is depicted in FIGS. 1A and 1B. Tank 1 contains a stiffened screen 4 fixed in one end of the tank with the first end of screen 4 slanting up over the top and the second end of screen 4 extending down toward the bottom of the tank. The stiffened screen 4 is pictured as a solid material but is preferably a two layer screen consisting of a stainless steel 30 mesh per square inch screen over hardware cloth with openings of approximately 1/8 inch square. Two side and top edges of the stiffened screen 4 are fastened between thin strips of solid plastic material to provide an exposed screen surface of approximately 20 by 13 inches. Screen 4 acts as a baffle against which the liquid containing solid particles can be directed for filtering and redirection toward screen 5 in the bottom of tank 1. The screen 5 is a relatively more coarse screen of about 15–20 mesh per square inch and is fixed over hardware cloth 25 with 1/8 inch square openings along the inside bottom surface of tank 1.

As is apparent in FIGS. 1 through 3, the tanks are similar in shape to old fashioned bath tubs being oval across the tops and bottoms and tapered inward from the tops to the bottoms. The tanks are constructed from a light weight plastic and collectively weigh a total of approximately 90 pounds. The tanks can of course vary in shape as long as they can telescope into one another and still allow space for collection of sludge inside the tanks. For example, round or more rectangular shapes instead of oval shaped tubs can be employed. A three tank combination is preferred to reduce plugging of the various filters employed. Approximately 75% of the solids are filtered out by tank 1 and the remaining 25% by the other two tanks 2 and 3. Generally speaking when the above three tank system is employed water actually overflows the top of tank 2 into tank 3. An alternative to the above three tank system would be to use only one 100 gallon tank equipped as indicated in tank 1 but with a bigger slanted screen.

The preferred embodiment of the process of the invention utilizes the above described tank assembly in combination with a sludge vacuum in the following manner.

Figure 5:
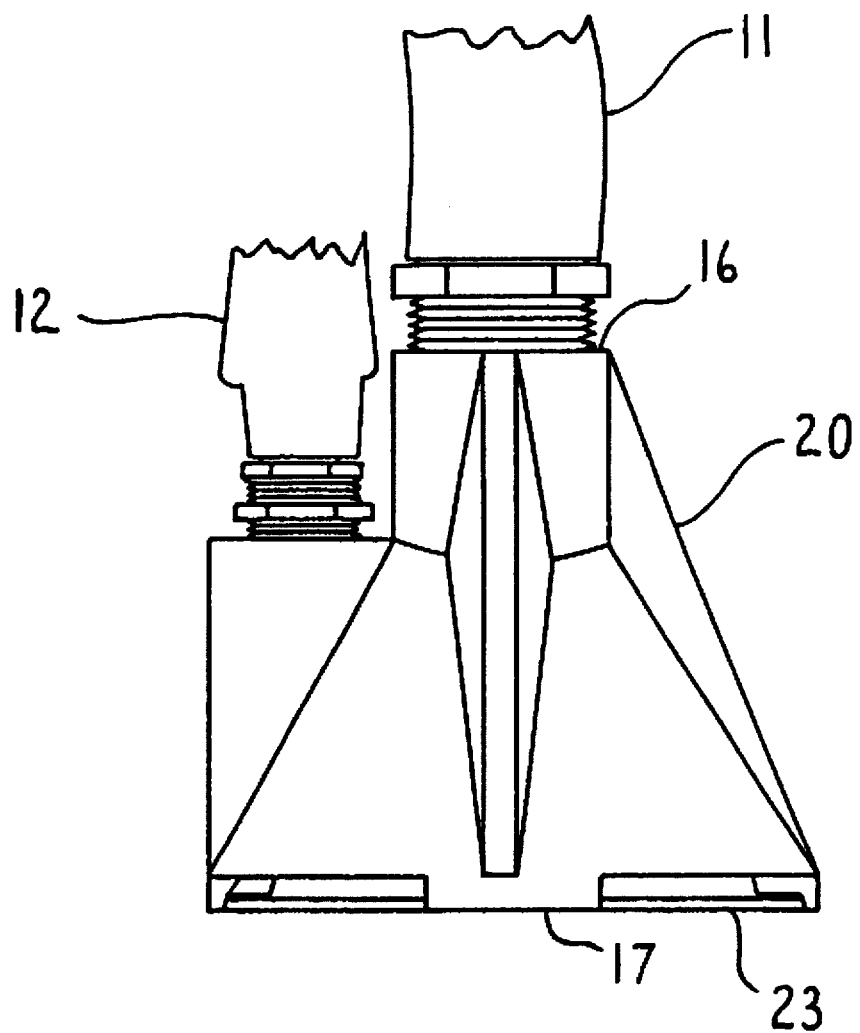
FIG. 5 depicts a frontal view of the sludge vacuum.

A water pressure wand 12, which is generally used in any car wash establishment, is connected to the passage 13 in truncated cone 10 of sludge vacuum 20 as depicted in FIG. 5. A ridged hose 11 of approximately 15 feet in length is connected to the truncated end 16 of cone 10. A plate 23 with holes 24 of about 3/8 inch in diameter throughout is fastened to the bottom or base of the sludge vacuum 20 to keep larger pieces of debris from plugging the sludge vacuum 20. The plate 23 can be removed to achieve larger flow rates. The openings in plate 23 are considerably larger than those in the screen 5 located in the bottom of tank 1. The discharge from the sludge vacuum 20 is 10–15 times the output of the wand 12, up to 60 gallons per minute. The greater the volume of the water passing through the wand 12, the greater the volume the sludge vacuum 20 will pump. The sludge vacuum 20 will lift the discharge 35 feet or more, and again the higher the pressure, the greater the lift. The hose 11 can be shortened or lengthened to suit the needs of the user. The sludge vacuum 20 is capable of pumping fluids hundreds of feet. A hose which is not ridged, like a fire hose, is not suitable since it will lay flat and require energy to open thereby limiting the distance the sludge vacuum 20 will pump. A 0 degree #5.5⅛" meg nozzle 21 is appropriate for the upward spray at 14 inside the cone 10, while a 0 degree #2⅛" meg nozzle 22 is appropriate for the downward spray at 15. The smaller nozzle at 15 will provide more force to help break up the sludge 19 in pit 18.

The large or base end 17 of the cone 10 is directed toward the sludge 19 at the bottom of sludge pit 18 with the water pressure turned on. The stream of water travels through passage 13 into the T-connector located in the approximate center of the cone 10 and is split both up to the end 14 of the passage directing water into the small or truncated end 16 of cone 10 and down to the end 15 of the passage directing water into and out of the large or base end 17 of cone 10. The stream of water directed into the sludge 19 through nozzle 22 stirs up the sludge 19 and mixes it with water. The stream of water directed up toward the truncated end 14 of cone 10 through nozzle 21 creates a venturi effect that propels the mixture of sludge 19 and water up the hose 11 connected to the truncated end 16 of cone 10.

The open end of hose 11 is directed against the slanted screen 4 in tank 1. The slant board 4 in tank 1 helps to break up the sludge 19 and redirects the wet sludge 19 down inside tank 1 over the screen 5 and hardware cloth 25 in the bottom of the tank. The force of the water enables the water to go through the screen 5, hardware cloth 25 and the holes 6 in the bottom of tank 1 leaving the particles of sludge 19 that are bigger than the openings in screen 5 and hardware cloth 25 in tank 1. The holes 6 in the bottom of tank 1 have very little filtering effect.

The water containing smaller particles than the mesh openings in screen 5 and hardware cloth 25 passes out of the bottom of tank 1 into tank 2 into which tank 1 is telescoped. The medium mesh bag 7 fitted over the top edges of tank 2 and down into tank 2 under the bottom of tank 1 retains the particles of sludge 19 that are bigger than the openings in mesh bag 7. Mesh bag 7 has a large enough opening at the top to fit loosely over the top of tank 2 and is large enough in capacity to loosely line the insides and bottom of tank 2.

The water containing even smaller particles of sludge 19 than the openings in mesh bag 7 then pass through the holes 6 in the bottom of tank 2 into tank 3. Some of the water may also overflow the top of tank 2 into tank 3 at the flow rates indicated above. The fine mesh bag 8 fitted over the top of tank 3 at its open end and down into tank 3 under the bottom of tank 2 retains the particles of sludge 19 that are bigger than the openings in mesh bag 8. Mesh bag 8 has a large enough opening at the top to fit loosely over the top of tank 3 and is large enough in capacity to loosely line the insides and bottom of tank 3. The water continues through mesh bag 8 through the holes 9 in the side of tank 3 where connecting hoses deliver the essentially sludge free water back to the pit 18 or into a sewer.

The sludge 19 left in tank 1 and the two bags 7 and 8 removed from tanks 2 and 3 are then deposited into a dumpster for final disposal in a landfill.

As used in this specification and the claims that follow the word "pit" is meant to include a trap or any other enclosed area in which particulate materials are collected and from which extraction of particulate materials is desirable for use or disposal.

The processes and products of the invention disclosed herein represent preferred embodiments of the invention. Many other variations are possible but are too numerous to disclose in their entirety. The words and drawings used herein are merely descriptive and illustrative and are not intended as exact representations of or inflexible limitations on the spirit and scope of the invention disclosed herein which can only be measured by the legally valid scope of the appended claims.

What is claimed is:

1. A device for vacuuming particulate materials comprising a cone shaped hollow intake having a truncated end with a small opening and a base end with a substantially larger opening, means for delivering a stream of water under pressure inside said cone shaped intake, means for directing said stream to an approximate center location within said cone shaped intake and thence along the axis of the cone through a first nozzle pointed toward the truncated end of said cone shaped intake and a second nozzle pointed toward the base of said cone shaped intake, and hose means connected to the truncated end of said cone shaped intake whereby said stream directed through said second nozzle is capable of stirring up and loosening particulate materials collected in an enclosure and said stream directed through said first nozzle is capable of creating sufficient suction by means of a venturi effect to vacuum the particulate materials out of said enclosure through said cone shaped intake and said hose means when the base of said cone shaped intake is pointed into said enclosure.

2. The device of claim 1 whereby a perforated plate is affixed to the base end of said cone shaped intake to filter out large particles and prevent said intake from becoming clogged.

3. A device suitable for vacuuming particulate materials out of a depressed enclosure comprising a hollow truncated cone shaped intake having an open truncated end and an open base end, a first passage suitable for directing a carrier liquid under pressure into said cone between said truncated and base ends of said cone, a second passage located along the axis of said cone and connected to said first passage between a first end of said second passage terminating in a nozzle pointed toward said truncated end of said cone and a second end of said second passage terminating in a nozzle pointing out of said base end of said cone wherein said carrier liquid passing out of said second end of said second passage is capable of loosening particulate materials in said depressed enclosure, said carrier liquid passing out of the said second end of said second passage is capable of creating a vacuum by a venturi effect as said carrier liquid passes through said truncated end of said cone into a hose connected to said truncated end of said cone.

4. The device of claim 3 wherein a perforated plate is affixed to the base end of said cone shaped intake to act as a filter for preventing large particles from clogging said intake.

5. The device of claim 3 wherein a hose is connected to the truncated end of said intake.

6. A process for extracting particulate materials from a depressed enclosure comprising directing a carrier liquid under pressure into a first passage positioned between an open truncated end and an open base end of a hollow truncated cone shaped intake, said first passage terminating into a second passage positioned along the axis of said cone, a first end of said second passage terminating in a nozzle pointed toward said truncated end of said cone and a second end of said second passage terminating in a nozzle pointing out of said base end of said cone whereby said carrier liquid passes through said first passage into and through said second passage, said carrier liquid passing out of said second end of said second passage loosens particulate materials in said depressed enclosure, said carrier liquid passing out of said first end of said second passage creates a vacuum by a venturi effect as said carrier liquid passes through said truncated end of said cone into a first end of a hose connected to said truncated end of said cone, and depositing the extracted particulate materials out of a second end of said hose into a suitable location for disposal or further processing.

* * * * *